(12) United States Patent
Yoshida et al.

(10) Patent No.: US 7,876,008 B2
(45) Date of Patent: Jan. 25, 2011

(54) FAN AND MOTOR HAVING MULTIPLE INSULATORS WITH AN AXIALLY PROTRUDING CONDUCTOR PIN

(75) Inventors: Yusuke Yoshida, Kyoto (JP); Kouji Muraoka, Kyoto (JP)

(73) Assignee: Nidec Corporation, Kyoto (JP)

(*) Notice: Subject to any disclaimer, the term of this patent is extended or adjusted under 35 U.S.C. 154(b) by 534 days.

(21) Appl. No.: 11/845,219

(22) Filed: Aug. 27, 2007

(65) Prior Publication Data
US 2008/0054735 A1 Mar. 6, 2008

(30) Foreign Application Priority Data
Aug. 31, 2006 (JP) .............................. 2006-235633

(51) Int. Cl.
H02K 3/52 (2006.01)
(52) U.S. Cl. .................. 310/71; 310/67 R; 310/216.115
(58) Field of Classification Search .............. 310/67 R, 310/71, 216.115; 417/423.7, 424, 354
See application file for complete search history.

(56) References Cited

U.S. PATENT DOCUMENTS

| | | | | |
|---|---|---|---|---|
| 4,682,065 | A | * | 7/1987 | English et al. ................. 310/90 |
| 4,934,041 | A | * | 6/1990 | Hoover et al. ................. 29/596 |
| 5,663,604 | A | * | 9/1997 | Takahashi .................... 310/91 |
| 6,531,796 | B1 | | 3/2003 | Konno |
| 6,700,262 | B2 | * | 3/2004 | Osawa et al. .................. 310/91 |
| 7,023,119 | B2 | * | 4/2006 | Doemen ..................... 310/90.5 |
| 2003/0146671 | A1 | * | 8/2003 | Diehl et al. ................. 310/254 |
| 2008/0054735 | A1 | * | 3/2008 | Yoshida et al. ............... 310/43 |

FOREIGN PATENT DOCUMENTS

| | | |
|---|---|---|
| JP | 60-7680 | 1/1985 |
| JP | 5-11779 | 2/1993 |
| JP | 06-165425 | 6/1994 |
| JP | 06-253482 A | 9/1994 |
| JP | 6253482 * | 9/1994 |

(Continued)

OTHER PUBLICATIONS

Machine Translation of 08-126238, "Outer Rotor Type, Two Phase Brushless Motor", May 17, 1996, Nobuyuki Nakagome.*

(Continued)

*Primary Examiner*—Karl I Tamai
(74) *Attorney, Agent, or Firm*—Keating & Bennett, LLP (57) ABSTRACT

Axially upper and lower end surfaces of the stator core 41 are substantially covered by the first insulator 421 and the second insulators 422, both of which are made of resin. A boss 4222 is arranged circumferentially between the two neighboring teeth 411. In the preferred embodiment of the present invention, three bosses 4222 are arranged at three out of four positions defined between any two neighboring teeth 411. A conductor pin 43 is inserted into each boss 4222 along the axial direction. The boss 4222 includes a hole extending axially upward from the axially lower end thereof, in which a conductor pin 43 is fitted. An axially lower position of the conductor pin 43 axially downwardly protrudes from the boss 4222. Into each of the notched portions 441 arranged to the circuit board 44, the conductor pin 43 is inserted and is soldered with the circuit board 44 such that the conductor pin 43 and the circuit board are electrically connected.

24 Claims, 9 Drawing Sheets

FOREIGN PATENT DOCUMENTS

| | | | |
|---|---|---|---|
| JP | 08126238 | * | 5/1996 |
| JP | 11-075335 | | 3/1999 |
| JP | 2000-287403 | | 10/2000 |
| JP | 2000-287408 | | 10/2000 |
| JP | 2000-292546 | | 10/2000 |
| JP | 2001-292546 A | | 10/2001 |
| JP | 2001-352705 | | 12/2001 |
| JP | 3459083 | | 8/2003 |

OTHER PUBLICATIONS

Official Communication issued in corresponding Chinese Patent Application No. 200710147877.3, mailed on Dec. 4, 2009.

* cited by examiner

FAN AND MOTOR HAVING MULTIPLE INSULATORS WITH AN AXIALLY PROTRUDING CONDUCTOR PIN

BACKGROUND OF THE PRESENT INVENTION

1. Field of the Invention

The present invention generally relates to a fan.

2. Description of Related Art

With numerous fans and drive motors for heat dissipation, disk drives, and like applications being installed in electronic devices, high speed motor operation is being demanded, in part because the demand for high speed data transfer and high heat dissipating capacity is increasing. A motor which rotates at a high speed is one answer to this need. In such a motor, however, a large electric current flows into a coil of an armature of the motor, and the coil generates considerable heat. In addition, with a recent advance of the electronic devices, a considerable heat is generated in a casing of the electronic device. In order to increase the heat dissipating capacity of a cooling fan, a motor used for the cooling fan rotates at high speed. In such a motor, as stated above, a large electric current flows into a coil of the motor, and the coil generates considerable heat.

SUMMARY OF THE INVENTION

In order to overcome the problems described above, preferred embodiments of the present invention provide a motor which may be used for a fan.

According to a preferred embodiment of the present invention, a motor includes a stator unit and a rotor unit rotatable about a center axis and including a rotor magnet. The stator unit includes a stator core having a core back and a plurality of teeth radially outwardly extending from the core back. A radially outside surface of each of the teeth radially faces the rotor magnet. The stator unit also includes a first insulator arranged at an axially one side of the stator core and a second insulator arranged the other side of the stator core. The second insulator includes a projection axially extending and arranged between circumferentially neighboring teeth and having a hole substantially axially extending therein from an axially other side end of the projection. The stator unit further includes a conductor pin inserted into the hole of the projection. An axially one side end thereof is arranged in the hole and an axially other side end of the conductor pin protrudes into the axially other side from the projection. The stator unit further includes a coil formed by winding a wire around each of the teeth via the first insulator and the second insulator and is electrically connected to the conductor pin. The stator unit further includes a circuit board arranged in the axially other side of the stator core via the second insulator, to which the other side end of the conductor pin is electrically connected. In the motor according to the preferred embodiment of the present invention, the projection is arranged at the axially other side from an axially middle of the stator core.

According to another preferred embodiment of the present invention, the core back has a substantially annular shape with a center through hole, and the circuit board includes a through hole defined by a radially inner surface of the circuit board. The circuit board further includes a notched portion in which the other side end of the conductor pin is inserted. The notched portion has an opening radially connecting to the through hole.

Other features, elements, steps, processes, characteristics and advantages of the present invention will become more apparent from the following detailed description of preferred embodiments of the present invention with reference to the attached drawings.

DETAILED DESCRIPTION OF THE PREFERRED EMBODIMENTS

Recently, the demand for the motor having the reduced axial height and outer dimension, as well as a capacity of rotating at high speed, is called for. In the motor having the reduced thickness and the small dimension, diameters and axial thicknesses of an armature and a rotor magnet is reduced, making the motor energy-inefficient. As a result, a large electric current flows into the coil of the motors generating considerable heat.

The heat may compromise reliability and endurance of the motor since a copper wire used for the coil has a temperature limit and the generated heat influences bearing life. Thus, the motor should be designed such that the heat generated by the coil does not exceed the temperature limit of the copper wire, or a technique to reduce the heat generated by the coil is demanded.

In order to decrease heat generated by the coil of the motor, the electric current flowing into the coil should be decreased. In order to decrease the electric current flowing into the coil, it is necessary to design an energy efficient motor. To provide the energy efficient motor, a packing factor of the coil should be increased.

With reference to FIGS. 1 through 6, a motor according to preferred embodiments of the present invention will be described in detail. It should be understood that in the description of the preferred embodiment of the present invention, when positional relationships among and orientations of the different components are described as being up/down or left/right, ultimately positional relationships and orientations that are in the drawings are indicated; positional relationships among and orientations of the components once having been assembled into an actual device are not indicated. In addition, an axial direction indicates a direction parallel to a rotation axis of the motor, and a radial direction indicates a direction perpendicular to the rotation axis.

Figure 1:
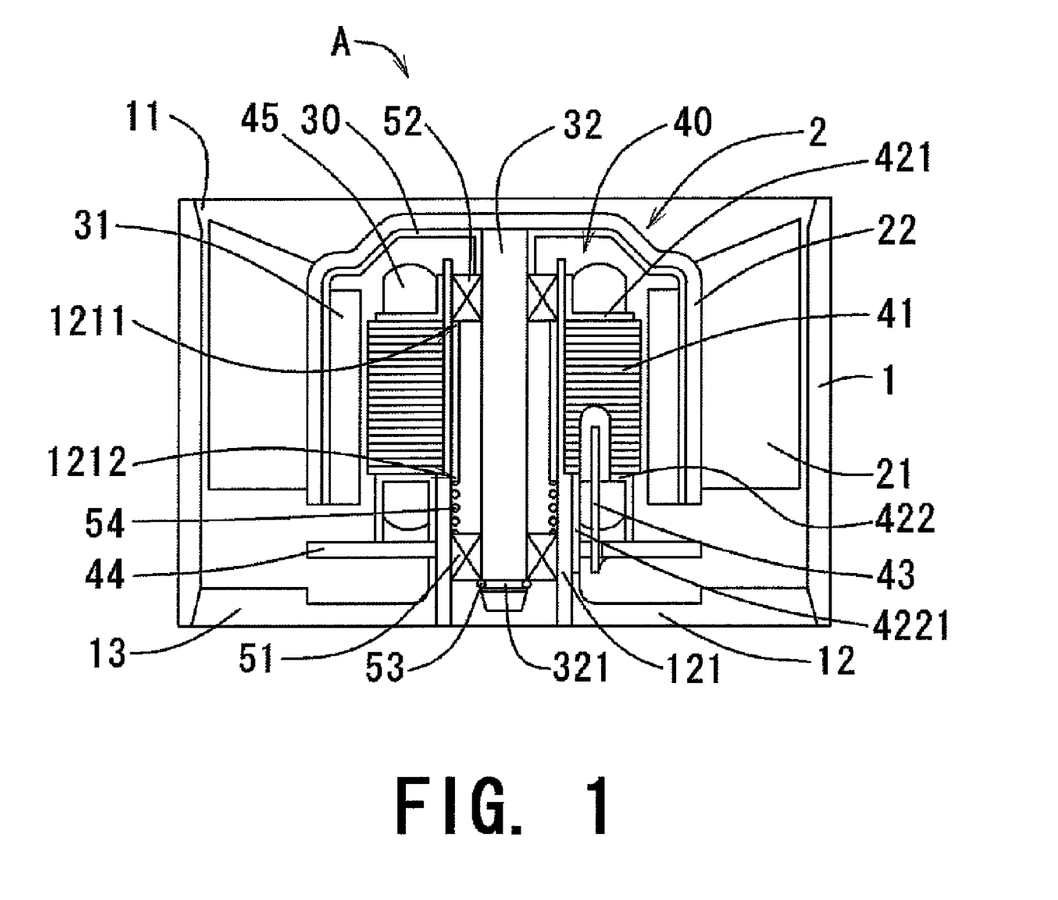
FIG. 1 is a cross sectional view illustrating a motor according to a preferred embodiment of the present invention.

FIG. 1 is a cross sectional view illustrating a motor according to the preferred embodiment of the present invention.

A fan A is configured such that an impeller 2 having a plurality of blades 21 rotates by providing electricity thereto from an external power supply. The impeller 2 includes a substantially operculated cylindrical hub 22, and a plurality of impeller blades 21 are arranged around an outer circumferential surface of the hub 22.

The fan 10 includes a base 12 and a bearing housing 121 arranged at a substantially center portion of the base 12. In the preferred embodiment of the present invention, the base 12 is formed by resin injection molding. The bearing housing 121 is formed by pressing and/or cutting metallic material. When the base 12 is molded, the bearing housing 121 is arranged in a set of dies and then the resin is injected. Thus, the bearing housing 121 and the base 12 are integrally jointed by injection molding. In the preferred embodiment of the present invention, the term "integrally jointed" indicates the state that a portion of the resin material defining the base 12 is in close contact with a portion of a surface of the bearing housing 121 such that the base 12 and the bearing housing 121 are fixed to each other.

An upper bearing-positioning portion 1211 and a lower bearing positioning portion 1212 for axially position an upper ball bearing 52 and a lower ball bearing 51 are arranged radially inside of the bearing housing 121. Each of the upper and lower ball bearings 51, 52 includes an inner ring, an outer ring, and a rolling element (e.g., a ball in the ball bearing) arranged between the inner and outer rings in a rollable manner. The outer rings of the upper and lower ball bearings 51, 52 are positioned with the upper and lower bearing positioning portion 1211, 1212, and fixed to the bearing housing 121. A shaft 32 is inserted into the inner rings of the upper and lower ball bearings 51 and 52. An annular groove 321 is arranged near an axially lower end of the shaft 32, and a wire-ring 53 is attached to the annular groove 321 such that the shaft 32 is not axially upwardly removed from the ball bearings 51 and 52, defining a retaining mechanism of the shaft 32. A bias spring 54 is arranged axially between the outer ring of the lower ball bearing 51 and the lower bearing positioning portion 1212. The bias spring 54 generates bias force directed in the axial direction between the inner ring and the outer ring of the lower ball bearing 51. It should be noted that a mechanism for retaining the shaft 32 and a position in which the bias spring 54 is arranged are not limited to that described above, the configuration thereof may be variously modified. Meanwhile, a slide bearing and a hydrodynamic bearing may be adapted as a bearing mechanism of the motor according to the preferred embodiment of the present invention.

A housing 1 radially surrounds the impeller 2 and defines a passage 11 of air flow generated by the rotation of the impeller 2. The housing 1 and the base 12 are connected to each other with four of ribs 13. It should be noted that the number of the ribs 13 may be other than three. Three or five of ribs 13 may be provided to fan A.

A rotor holder 30 is interference fitted into radially inside of the hub 22. The rotor holder 30 prevents magnetic flux from leaking outside of the fan A. An annular rotor magnet 31 is attached to radially inside of the rotor holder 30. The rotor magnet 30 is magnetized in the circumferential direction such that S and N poles are alternately arranged. A through hole is arranged at a center of the rotor holder 30, and an axially upper end of the shaft 32 is interference fitted into the through hole. In the preferred embodiment of the present invention, the rotor holder 30 is formed by press working, and a through hole of the rotor holder 30 is formed by burring. As described above, the shaft 30 is inserted into radially inside of the inner rings of the ball bearings 51 and 52, and is supported in a manner rotatable relative to the bearing housing 121.

A stator 40 is attached to a radially outer surface of the bearing housing 121. The stator 40 includes a stator core 41, a first insulator 421, a second insulator 422, and a circuit board 44. The stator core 41 is formed by laminating a plurality of metallic plates having center through holes. The stator core 41 includes an annular core back having a radially inner surface of the stator core 41 defining a center through hole. The radially inner surface is fixed to the radially outer surface of the bearing housing 121 by an adhesive. It should be noted, however, the stator core 41 is fixed to the bearing housing 121 by other techniques, such as interference fitting. The stator core 41 includes four teeth 411 arranged in a circumferentially equally spaced manner and radially outwardly extending from the core back. Each of the teeth 411 has a T-shape in an axially top view, wherein the crossbar of the T-shape radially faces the rotor magnet 31 via a gap defined therebetween. Axially upper and lower end surfaces of the stator core 41 are substantially covered by the first insulator 421 and the second insulators 422, both of which are made of resin. A wire is wound around each of the teeth 411 via the first insulator 421 and the second insulator 422, defining a coil 45 on each of the teeth 421. The first insulator 421 and the second insulator 422 are formed by resin injection molding, enabling to form the first insulator 421 and second insulator 422 in complicated shapes which correspond to an outline of the stator core 41. With the first insulator 421 and the second insulator 422 made of resin, the stator core 41 is electrically insulated from the coil 41.

The circuit board 44 controlling rotation of the impeller 2 is arranged axially below the stator 41. Specifically, the circuit board 44 is attached to an axially lower portion of the second insulator 422. The circuit board 44 mainly includes electronic components (e.g., a hall element and a driving IC) and a circuit pattern, both of which are mainly arranged on an axially lower surface of the circuit board 44. As described above, a series of controlling circuit is defined by electrically connecting the wire of the coil 45 to the circuit pattern.

Figure 2:
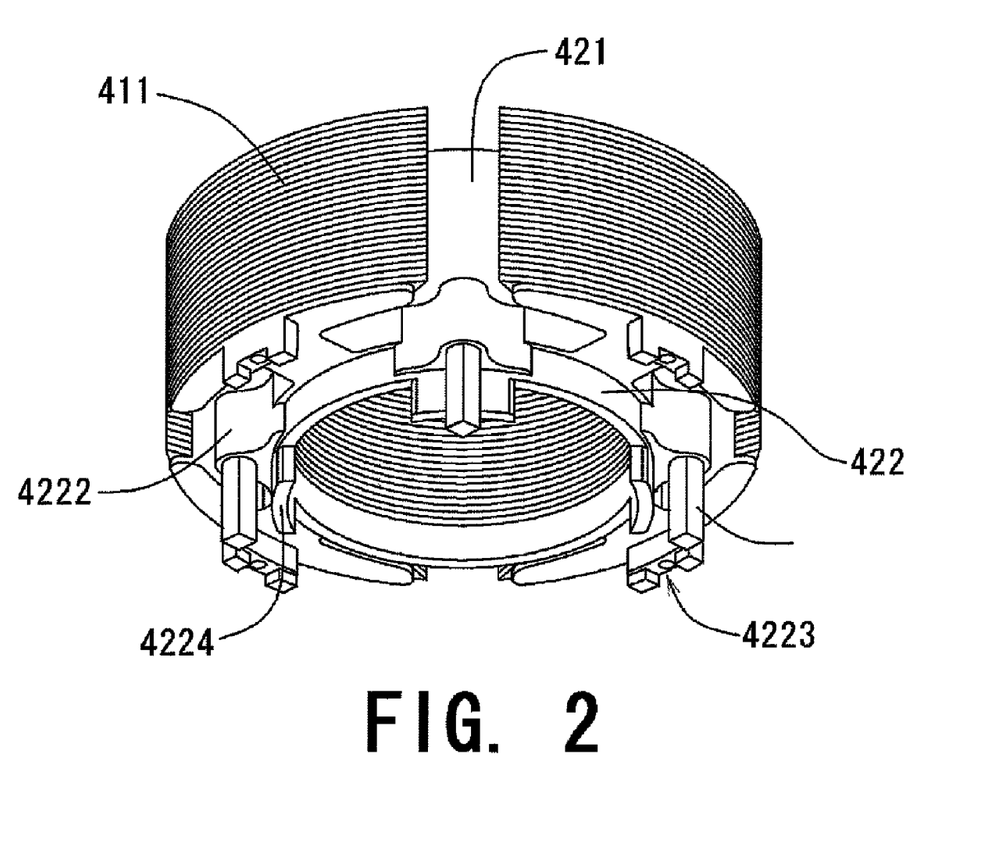
FIG. 2 is a perspective view illustrating a stator unit of the motor according to a preferred embodiment of the present invention.
Figure 3A:
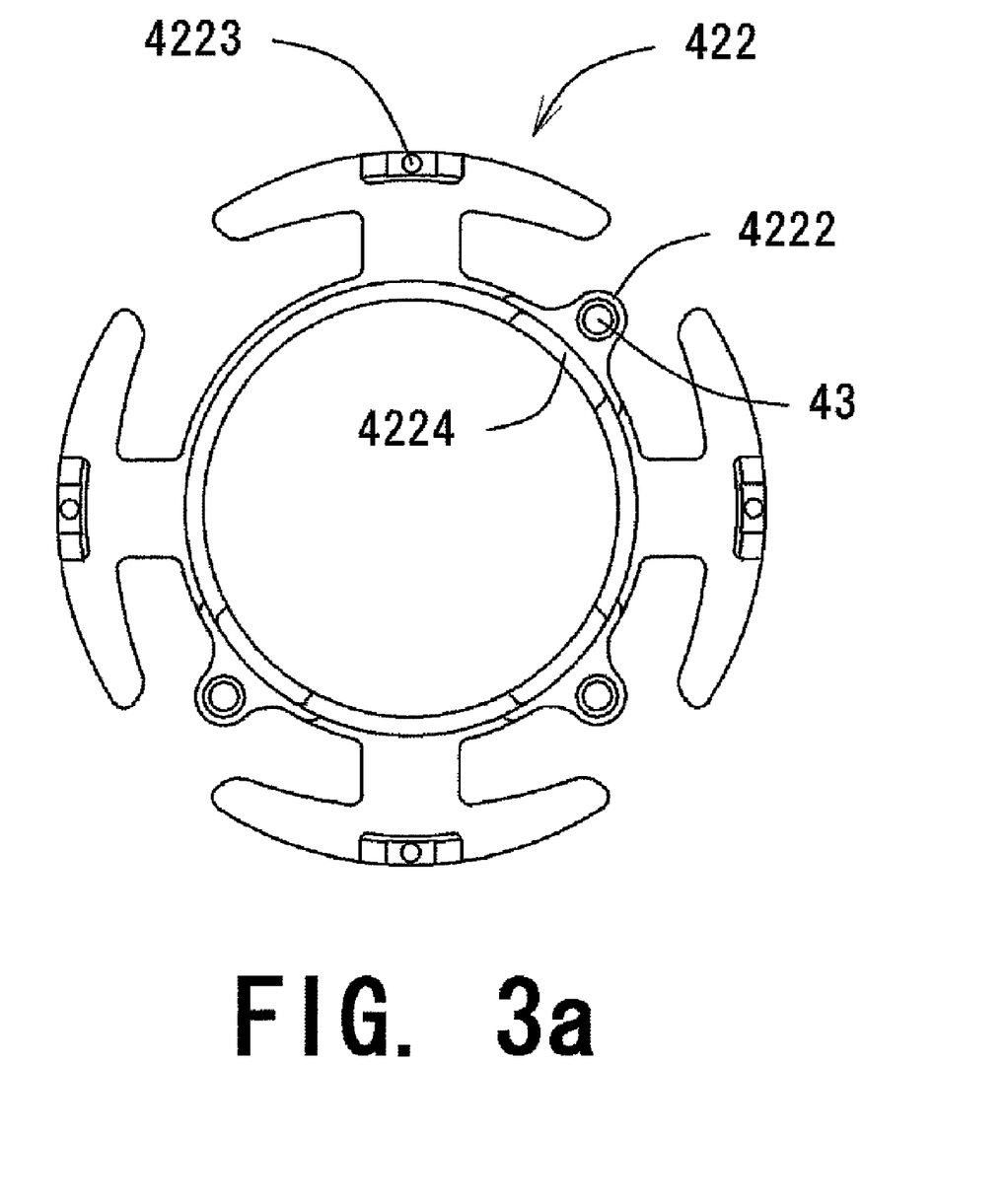
FIG. 3A is a plan view illustrating an insulator of the motor according to a preferred embodiment of the present invention.
Figure 3B:
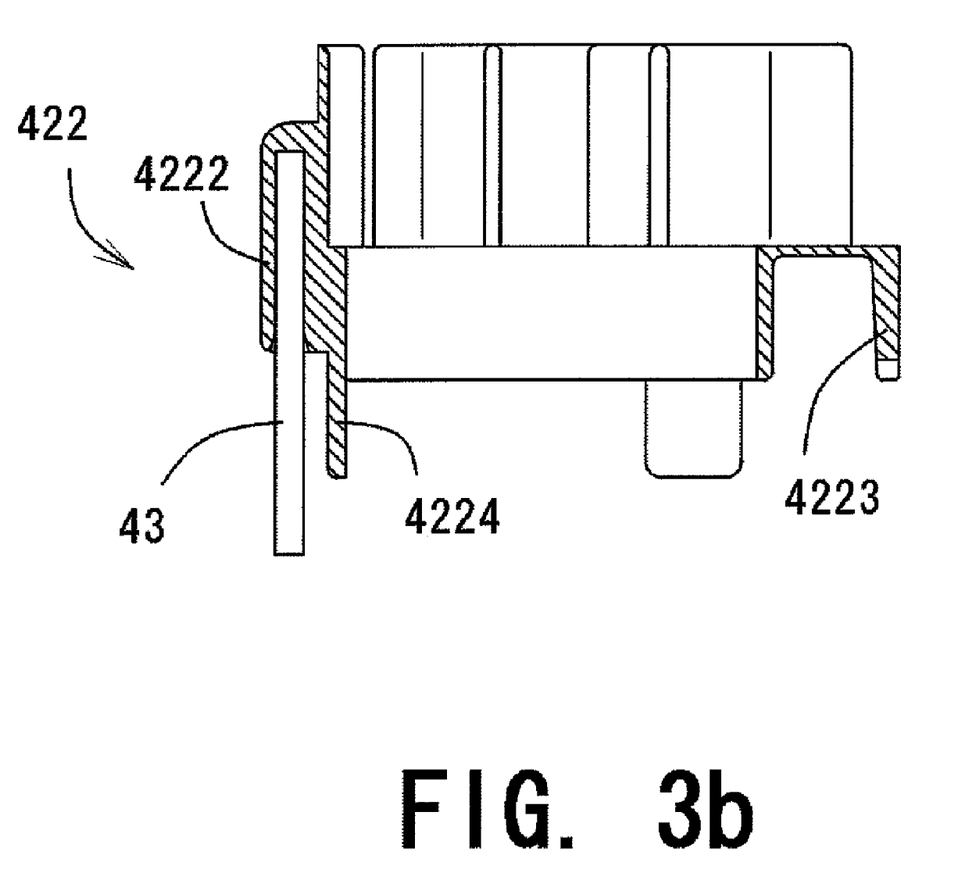
FIG. 3B is a cross sectional view illustrating the insulator of the motor according to a preferred embodiment of the present invention.

FIG. 2 is a perspective view illustrating the stator 40. FIG. 3A is a plan view illustrating the second insulator 422, and FIG. 3B is a cross sectional view illustrating the second insulator 422. As illustrated in FIG. 2, a boss 4222 which is a projection axially extending along the radially outer surface of the second insulator is arranged circumferentially between the two neighboring teeth 411. In the preferred embodiment of the present invention, three bosses 4222 are arranged at three out of four positions defined between any two neighboring teeth 411. Each boss 4222 is arranged axially lower from an axially middle position of the stator core 41. The boss 4222 includes a hole extending axially upward from the axially lower end thereof, in which a conductor pin 43 is inserted. A diameter of the hole is slightly smaller than that of the conductor pin 43, whereby the conductor pin 43 is interference fitted into the hole of the boss 4222. An axially lower position of the conductor pin 43 axially downwardly protrudes from the boss 4222. One end of the wire defining the coil 45 is entwined with and is soldered to the axially lower position of the conductor pin 43. The wire includes an insulating coating which is melted on soldering the wire and the conductor pin 43, whereby the coil 45 is electrically connected to the conductor pin 43 by soldering.

When the stator core 41 includes four teeth 411 and four coils 45, the fan A is generally driven by single-phase full-wave current or double-phase half wave current. When the fan A is driven by the single-phase full wave current, two out of three conductor pins 43 are connected with the coils 45. More particularly, one wire defines four coils 45, whereby both side ends (i.e., two ends) of the wire are electrically connected to two of three conductor pins 43 respectively. Thus, one of three conductor pins 43 is not connected with the wire. When the fan A is driven by the double-phase half-wave current, two wires are used to define four coils 45, whereby four ends of the wires are led from the coils 45. One ends of two wires are connected to one common conductor pin 43, and another ends of two wires are separately connected to the separate conductor pins 43. Thus, by providing three bosses 4222 and three conductor pins 43, the fan A may be driven by either one of single-phase full-wave current or double-phase half-wave current. It should be noted that the fan A may be driven by other techniques. In addition, a wire-winding manner and the like are not limited to those described above.

In order to increase a packing factor of the coil 457 a ratio of volume the coil 45 occupying in the total volume in the motor, following techniques may be adapted to the fan A.

(1) A portion of each of teeth 411 to which the wire is wound is made narrower.

(2) The portion of each of the teeth 411 is radially lengthened relative to the predetermined diameter of the stator core 41.

(3) Do not arrange obstacles for winding the wire in the space defined between the neighboring teeth 411.

By adapting the technique (1), the packing factor of the coil 45 is increased, but a magnetic path in the teeth 411 is also made narrower, inhibiting to define an ideal magnetic path. Thus, the stator core 41 should be designed to increase the packing factor of the coil 45 while taking into the preferable magnetic path into account. In order to adapt the technique (3), the conductor pin 43 is arranged at a radially outside tip of each of the teeth 411. Thus, by adapting the technique (3), the boss 4222 arranged neighboring teeth 411 is not necessarily provided to the fan A. In order to adapt (2), the cross bar of the T-shape of each of the teeth 45 is made thinner in the radial direction, such that the portion of teeth 411 to which the wire is wound is lengthened. By making the cross bar of the T-shape thinner, however, the conductor pin 43 may not be arranged at the radially outside tip of each of the teeth 41. In other words, both techniques (2) and (3) may not be adapted to the fan A in one time. By comparing the techniques (2) and (3), the packing factor of the coil 45 is increased more with the technique (2). Thus, in the preferred embodiment of the present invention, the technique (2) is adapted to design the electrically efficient motor.

In the preferred embodiment of the present invention, the boss 4222 is provided to the second insulator 422, but not to the first insulator 421. In the motor according to the preferred embodiment of the present invention, in the axially middle portion of the coil 45 is generally the widest in the circumferential direction, whereby in order to increase the packing factor of the coil, a widest clearance should be secured at the axially middle portions of the neighboring teeth 411. The first insulator 421 has a longer axial length than that of the second insulator 422. Through the configuration, a portion at which the first insulator 421 and the second insulator 422 are joined is arranged axially lower than the axially middle portion of the coil 45. Thus, since any obstacle for winding the wire around each of the teeth 411 is arranged between the neighboring teeth 411 at same axial level of the axially middle portion of the stator core 41 (corresponding the axially middle portion of the coil 45), the wire defining the coil 45 is smoothly wound around the each of the teeth while the high packing factor of the coil 45 is preferably increased.

Figure 4:
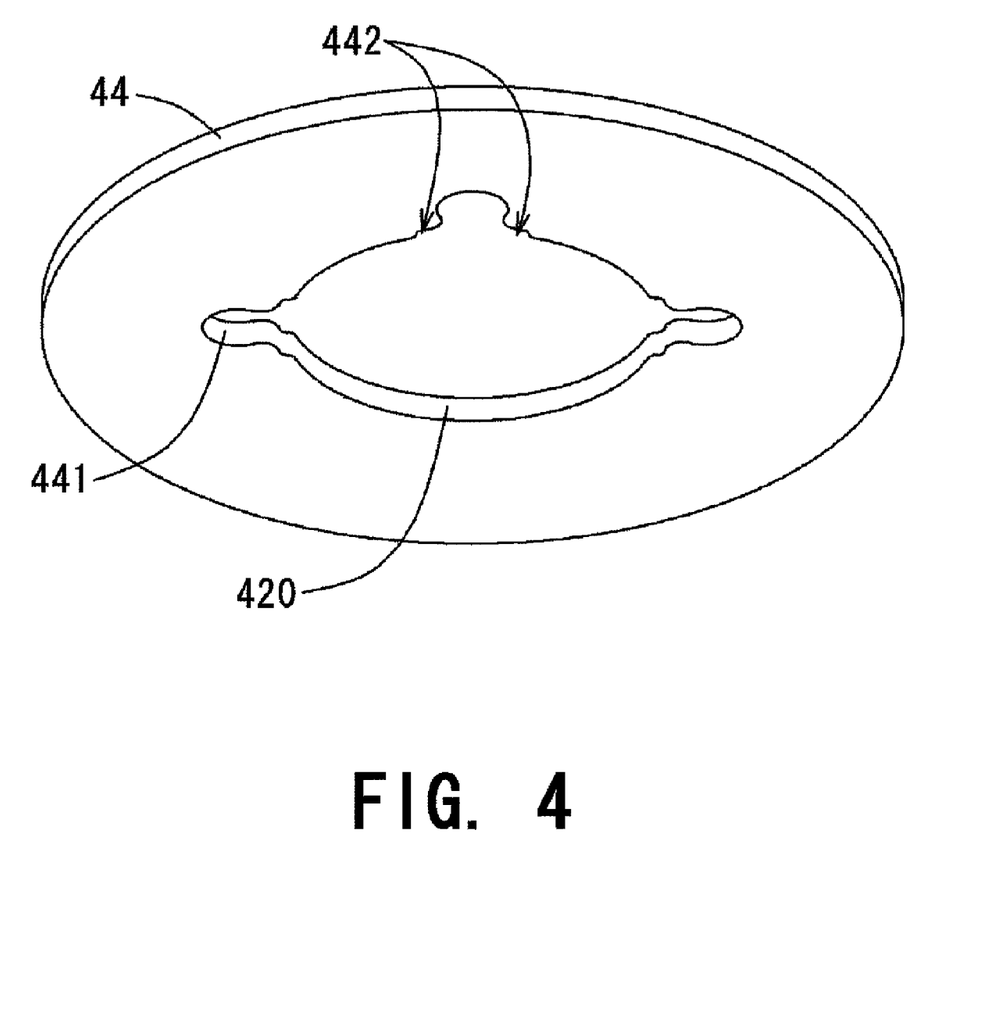
FIG. 4 is a perspective view illustrating a circuit board of the motor according to a preferred embodiment of the present invention.
Figure 5:
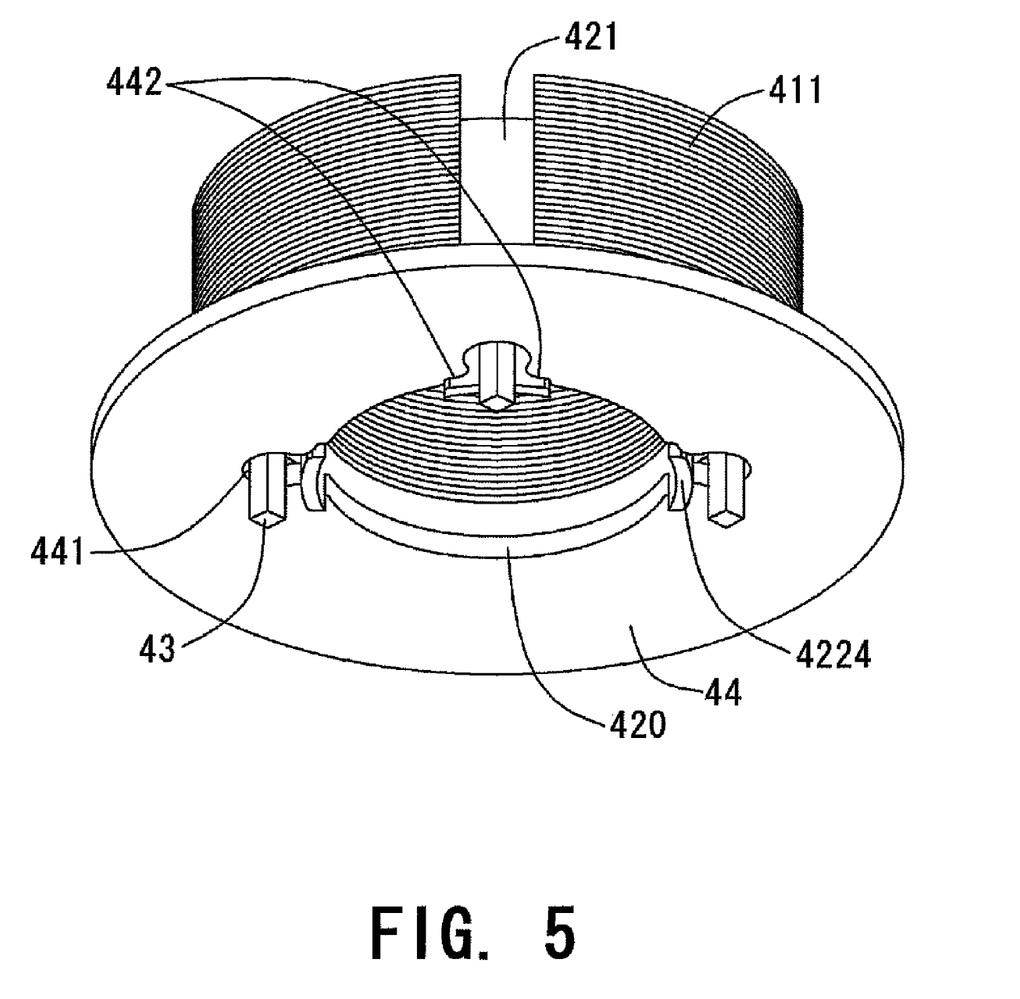
FIG. 5 is a perspective view illustrating a work in process having the circuit board and the stator core arranged on the circuit board.

FIG. 4 is a perspective view illustrating the circuit board 44 used for the motor according to the preferred embodiment of the present invention. FIG. 5 is a perspective view illustrating a work in process having the circuit board 44 and the stator core 41 arranged on the circuit board 44. The circuit board 44 includes a through hole 420 penetrating therethrough at a center of the circuit board 44. The stator core 41 is mounted on the circuit board 44, while a center axis of the through hole 420 is aligned with that of the center through hole of the stator core 41. In the preferred embodiment of the present invention, a diameter of the through hole 420 is substantially the same or slightly greater than that of the center through hole of the stator core 41. Then, the bearing housing 121 is inserted in the through hole 420 and the center through hole of the stator core 41 and the circuit board 44 is arranged radially outside of the bearing housing 121.

As illustrated in FIG. 4, a radially inner surface of the circuit board 44 defining the through hole 420 includes three notched portions 441 at each of which the radially inner surface is radially outwardly indented. The notched portions 441 are arranged such that the three of conductor pins 43 are inserted into the notched portions 441 respectively when the stator core 41 is mounted on the circuit board 44. Each of the notched portion 441 includes a opening radially connecting to the through hole 420.

Figure 7:
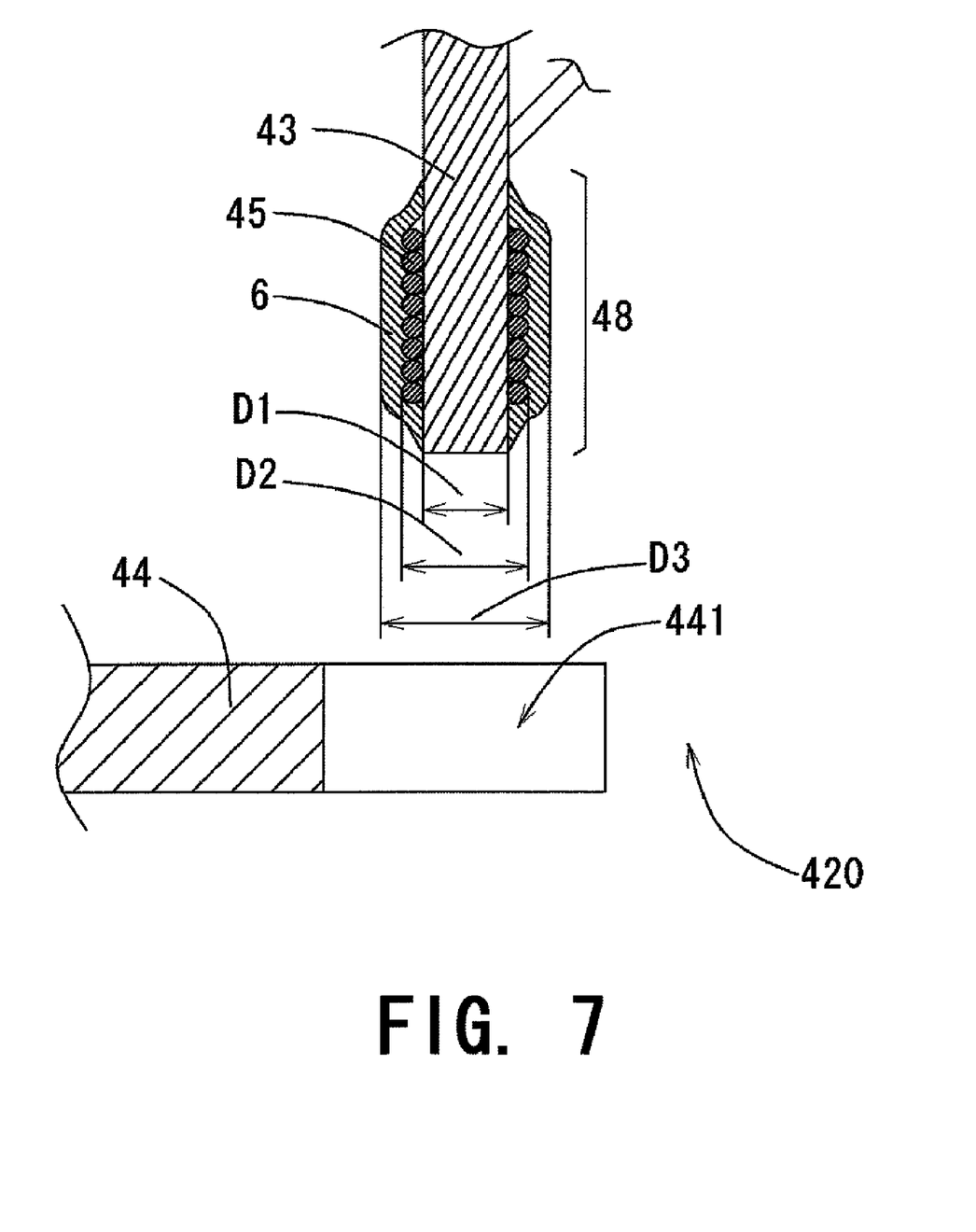
FIG. 7 is a cross sectional view illustrating a notched portion of the circuit board and the conductor pin to be inserted into the notched portion.

With reference to FIG. 7, a relationship between a size of the notched portion 441 and the conductor pin 43. FIG. 7 illustrates a cross section of the circuit board 44 at the notched portion 441 and the conductor pin 45 around which the wire is entwined, to be inserted into the notched portion 441. In the preferred embodiment of the present invention, the conductor pin 43 has a square pole shape, but the conductor pin 43 may be any other suitable shape (e.g., a cylindrical shape and the like).

As illustrated in FIG. 7, the wire defining the coil 45 turns a plurality of times around the conductor pin 43 to entwine the wire around the conductor pin 43, and then the wire is soldered to the conductor pin 43. Therefore, the axially lower portion of the conductor pin 43 around which the wire is entwined becomes thicker. The width of the notched portion 441 is determined such that the portion of the conductor pin 43 which the wire is entwined around and soldered to is barely inserted therein. A shape of the notched portion 441 is preferably an arc shape due to the fact that the clearance between the radially inner surface of the circuit board and the portion of the conductor pin 43 which the wire is entwined around and soldered to can be maintained substantially constant in the notched portion 441. It should be noted, however, the shape of the notched portion 441 may be variously modified.

As illustrated in FIG. 7, the conductor pin 43 has the square pole, having a length D1 on a side. A length D2 is defined by adding the length D1 and the diameter of the wire entwined around the conductor pin 43. A length D3 is a length (e.g., a diameter) defined by adding the thickness of a solder 6 to the length D2. In the preferred embodiment of the present invention, the conductor pin 43 is the square pole, about 0.6 mm on the side (i.e., the length D1 is about 0.6 mm). The diameter of the wire is about 0.15 mm, thus the length D2 is about 0.9 mm. The wire and the conductor pin 43 are soldered, and the portion of the conductor pin 43 and the wire are roundly covered by a solder 6. With the axially lower portion of the conductor pin 43, the wire 45, and the solder 6, an inserting portion 48 having a diameter D3 is defined. In the preferred embodiment of the present invention, the amount of solder 6 used for soldering the wire and the conductor pin 43 is controlled so that the diameter D3 is to be about 1.5 mm or less. A type of the wire defining the coil 45 may be changed depending on rotational characteristics of the motor whereby the length D2 may be variously modified. In that case, by controlling the amount of solder 6, the diameter D3 of the inserting portion may be adjusted to be less than 1.5 mm.

The inserting portion 48 is arranged in the notched portion 441. In the preferred embodiment of the present invention, a width L of the notched portion 441 in the arc shape is configured such that the clearance between the radially inner surface of the circuit board 44, defining the notched portion 441 and the inserting portion 48 is to be about 0.5 mm or greater. In other words, the ratio of the diameter D3 to the width L is preferably configured about 0.75:1. In case that the diameter D3 is smaller than the width L, it is possible to arrange the inserting portion 48 of conductor pin 43 into the notched portion 441. However, if the clearance is set too narrow, the inserting portion 48 may come in contact with the circuit board 44 and damage the circuit pattern and/or the lands on the circuit board 44. Thus, the diameter of the inserting portion 48 and the width L of the notched portion 441 should be carefully determined. On the other hand, with a large clearance provided between the inserting portion 48 and the radially inner surface of the circuit board 44, soldering the conductor pin 43 to the circuit board 44 will be difficult. Thus, it is preferable that the ratio of the D3 to L is configured within the range of about 0.5:1 to about 0.9:1, more preferably from about 0.6:1 to 0.75:1.

The second insulator 422 includes four of protruding portions 4223 which axially downwardly extending at axially below the crossbars of T-shapes of the teeth 411. When the stator core 41 is mounted on the circuit board 44, the axially lower ends of the protruding portions 4223 come in contact with the circuit board 44 to axially position the stator core 41 relative to the circuit board 44. Lands are arranged on an axially lower surface of the circuit board 41 to surround the notched portions 441. The conductor pins 43 are soldered to the lands of the circuit board 44, and thus, the coil 45 and the control circuit arranged on the circuit board 44 are electrically connected via the conductor pins 43.

Figure 8:
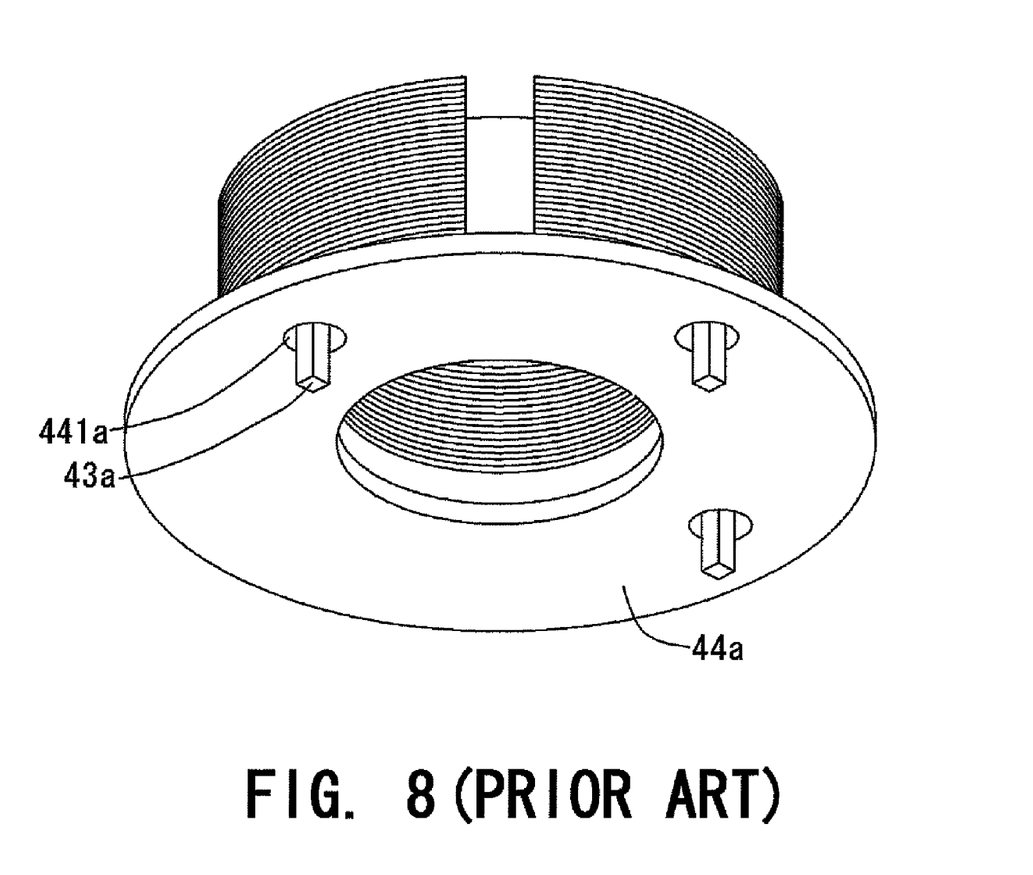
FIG. 8 is a perspective view illustrating a conventional circuit board and a conventional stator core arranged on the circuit board.

Conventionally, the circuit board includes through holes in which the conductor pins are inserted as illustrated in FIG. 8. In the preferred embodiment of the present invention, the conductor pin 43 is inserted into the notched portion 441 occupying a smaller area on the circuit board 44. Since the notched portion 441 occupies a smaller area of the circuit board 44 than the through hole does, it is possible to use more area for mounting electronic components on the circuit board 44. In case that there is enough space provided for mounting electronic components on the circuit board 44, it is possible to reduce a size of the circuit board 44 by providing the notched portion 441 instead of the through hole. By reducing the size of circuit board 44, the material cost for manufacturing the circuit board 44 may be reduced. In general, the diameter of the hub 22 of impeller 2 is determined to have a substantially the same or greater diameter than that of the circuit board 44. If that is the case, by reducing the size of the circuit board 44, it is possible to more freely design the fan A, enabling the fan A having improved characteristics.

In addition, when the through hole in which the conductor pin 43 is inserted is provided to an inner peripheral area of the circuit board 44, a portion of the circuit board 44 radially inside of the through hole may become thin, which may be broken or damaged in the manufacturing process of the motor and the fan A due to the concentration of the stress thereto. When the portion of the circuit board 44 is broken or damaged, the circuit pattern and/or the land may be peeled or damaged. In the preferred embodiment of the present invention, since the circuit board 44 includes the notched portion 441 instead of the through hole, it is possible to prevent the above problem.

Figure 6:
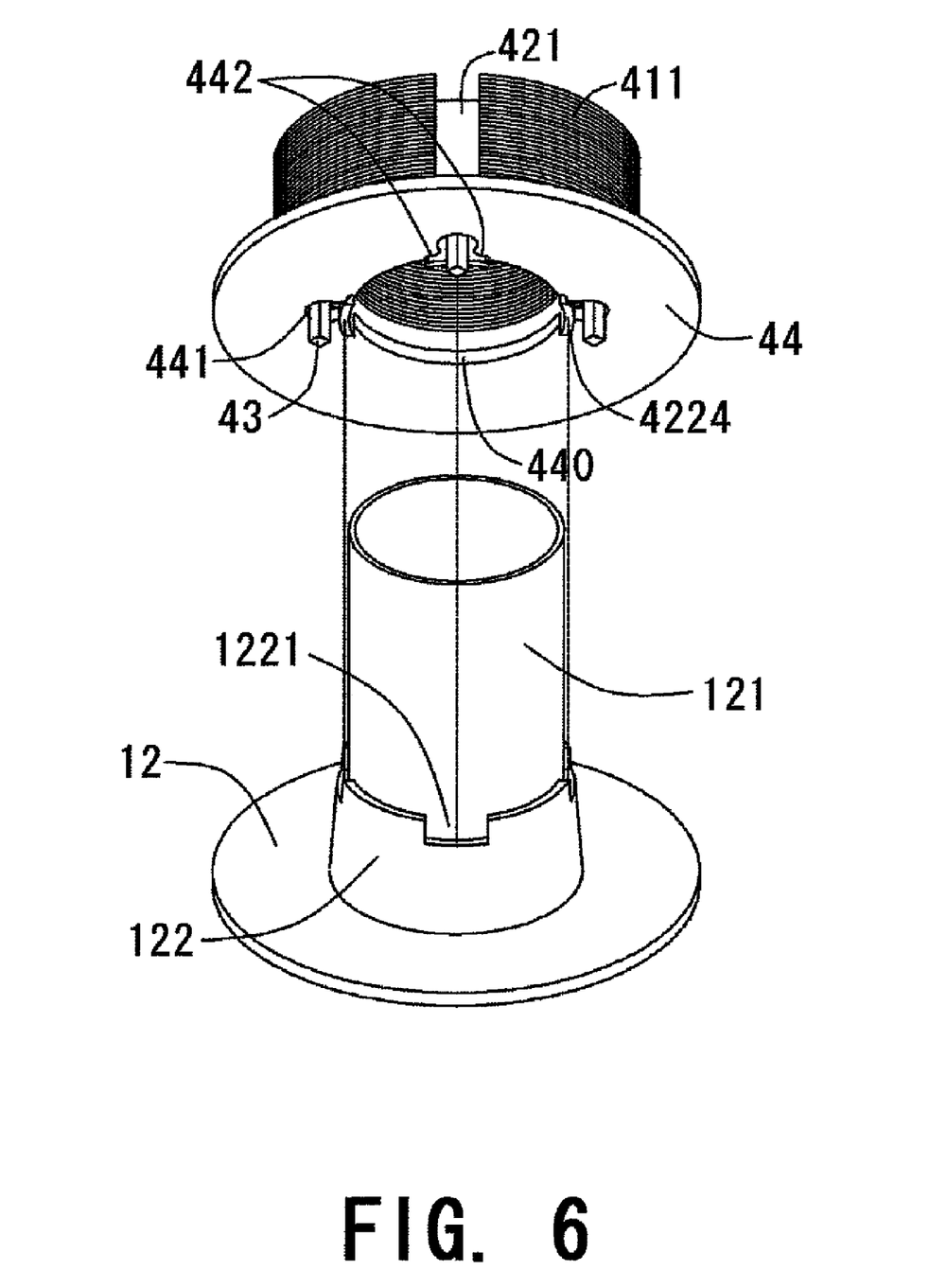
FIG. 6 is a view illustrating a process of positioning the stator unit on a bearing housing of the motor according to a preferred embodiment of the present invention.

FIG. 6 is a view illustrating a process of positioning the stator unit 40 on a bearing housing 121. The second insulator 422 includes a convex portion 4224 axially downwardly extending at radially inside of each of the boss 4222. As stated above description, the bearing housing 121 is made of the metallic material, having an electronic conductivity, and each of the notched portions 441 is defined by a portion of radially inner surface of the circuit board 44 is radially outwardly indented (i.e., radially insides of the notched portions 441 open into the through hole 420). Into each of the notched portions 441, the conductor pin 43 is inserted and is soldered with the circuit board 44 such that the conductor pin 43 and the circuit board are electrically connected. In the preferred embodiment of the preset invention, the circuit board 44 is configured to have an area for mounting the electronic components as large as possible, whereby the radially outer surface of the bearing housing 121 and the radially inner surface of the circuit board 44 are arranged in a vicinity manner. In addition, the conductor pin 43 is inserted into the notched portion 441 radially opening into the through hole 420, the conductor pin 43 radially opposes the radially outer surface of the bearing housing 121 in the notched portion 441. When the conductor pin 43 and the bearing housing 121 come in contact with each other by chance, the fan A may be falsely operated. In the preferred embodiment of the present invention, the second conductor 422 includes the convex portion 4224 which is to be arranged radially between the boss 4222 and the bearing housing 121 (i.e., radially between the conductor pin 43 and the bearing housing 121), such that the short circuit between the conductor pin 43 and the radially outer surface of the bearing housing 121 is prevented.

In the preferred embodiment of the present invention, the second insulator 422 includes three convex portions 4224 having radially inner surface defining parts of the cylindrical shape centered on the center axis and having a diameter substantially the same as that of the through hole 420 of the circuit board 44. The circuit board 44 includes three recesses 442 in of which the convex portions 4224 are arranged. Each of the recess 442 is a portion at which the radially inner surface of the circuit board 44 radially outwardly indented around the notched portion 441 and connected to the notched portion 441. Each of the recess has a depth in the radial direction substantially the same as a radial thickness of the convex portion 4224, and a width in a circumferential direction substantially the same as that of the convex portion. By arranging the convex portions 4224 into the recesses 442, the second insulator 422 (i.e., the stator core 41) can be circumferentially positioned on the circuit board 44 when the stator core 41 is mounted on the circuit board 44. The conductor pin 43 to which the end of the wire is soldered is inserted into the notched portion 441. A type of the wire defining the coil 45 may be changed depending on rotational characteristics of the motor whereby the notched portion 441 is configure to have enough space in which the conductor pin 43 around which a thick wire is entwined can be barely inserted. Therefore, there is provided a clearance between the conductor pin 43 and the radially inner surface of the circuit board 44 defining the notched portion 441, making it difficult to circumferentially precisely position the stator core 41 on the circuit board 44 by inserting the conductor pins 43 into the notched portions 441. In the preferred embodiment of the present invention, there is provided positioning mean, convex portions 4224 of the second insulator 422 and the recesses 442 of the circuit board, enabling the positioning of the stator core 41 on the circuit board 44.

As illustrated in FIG. 6, the bearing housing 121 and the base 12 is formed into a single piece of member. The axially lower portion of the bearing housing 121 is covered by the portion of the resin material defining a fixing portion 122 of the base 12 in a manner closely contacting with the axially lower portion of bearing housing 121. Through the configuration, the bearing housing 121 and the base 12 are securely fixed to each other. As illustrated in FIG. 6, the fixing portion 122 includes three concave portions 1221 to which the convex portions 4224 of the second insulator 422 are fitted when the stator unit 40 and the bearing housing 121 are joined together. Each of the concave portions 1221 is formed by hollowing a portion of the fixing portion 122 such that a portion of the radially outer surface is exposed radially outside in the concave portion 1221. By fitting the convex portions 4224 of the stator unit 40 into the concave portions 1221 of the bearing housing 121, the stator unit 40 and the bearing housing 121 are positioned to each other in a precise manner. Meanwhile, in the preferred embodiment of the present invention, the stator core 41 and the bearing housing 121 are positioned with the concave portion 4224 and the convex portion 1221. It should be noted, however, other techniques for positioning the stator core 41 and the bearing housing 121 may be adapted to the preferred embodiment of the present invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A motor comprising:
    a rotor unit rotatable about a center axis and including a rotor magnet;
    a stator unit including:
        a stator core including a core back and a plurality of teeth radially outwardly extending from the core back, a radially outside surface of each of the teeth radially faces the rotor magnet,
        a first insulator arranged at an axially one side of the stator core,
        a second insulator arranged at an axially other side of the stator core, the second insulator includes a projection axially extending and arranged between circumferentially neighboring teeth and including a hole substantially axially extending therein from an axially other side end of the projection,
        a conductor pin inserted into the hole of the projection, an axially one side end of the conductive pin is arranged in the hole and an axially other side end of the conductor pin protrudes into the axially other side from the projection,
        a coil defined by winding a wire around each of the teeth via the first insulator and the second insulator and is electrically connected to the conductor pin,
        a notched portion in which the axially other side end of the conductor pin is inserted, and
        a circuit board arranged in the axially other side of the stator core via the second insulator, to which the other side end of the conductor pin is electrically connected, and
    a base arranged to support the stator unit thereon, wherein the projection is arranged axially lower than an axially middle point of the stator core,
    the wire is entwined around a portion of the conductor pin that includes a solder material electrically connecting the wire and the conductor pin, the portion of the conductor pin includes a width that is smaller than a width of the notched portion,
    the second insulator includes a convex portion axially extending to the axially other side at a position radially inside of the conductor pin, the convex portion radially faces the conductor pin, and
    the base includes a concave portion in which the convex portion of the second insulator is fitted such that the stator unit is positioned on the base in the circumferential direction.

2. The motor as set forth in claim 1, wherein the stator core includes four teeth.

3. The motor as set forth in claim 2, wherein the motor includes at least two projections, each of the projections are arranged at a position between at least two of four spaces defined between neighboring teeth.

4. The motor as set forth in claim 1, wherein
    the core back includes a substantially annular shape with a center through hole,
    the circuit board includes a through hole defined by a radially inner surface of the circuit board, and
    the notched portion includes a opening radially connecting to the through hole.

5. A fan comprising:
    the motor as set forth in claim 1;
    a plurality of blades arranged on the rotor unit and arranged to generate an air flow upon a rotation of the motor.

6. The motor as set forth in claim 1, wherein
    the circuit board includes a recess which is defined by a portion of a radially inner surface of the circuit board that is indented radially outward,
    the recess includes a width in a circumferential direction greater than that of the opening of the notched portion, and
    the convex portion includes a width in the circumferential direction substantially the same as that of the recess and a thickness in the radial direction substantially the same as a depth in the radial direction of the recess, the convex portion is arranged in the recess.

7. A motor comprising:
    a rotor unit rotatable about a center axis and including a rotor magnet; and
    a stator unit including:
        a stator core including a core back in a substantially annular shape with a center through hole and a plurality of teeth radially outwardly extending from the core back, a radially outside surface of each of the teeth radially faces the rotor magnet,
        a first insulator attached to the stator core from an axially one side,
        a second insulator attached to the stator core from an axially other side, the second insulator includes a projection axially extending, arranged between circumferentially neighboring teeth and including a hole substantially axially extending therein from an axially other side end of the projection,
        a conductor pin inserted into the hole of the projection, an axially one side end thereof is arranged in the hole and an axially other side end of the conductor pin protrudes into the axially other side from the projection,
        a coil defined by winding a wire around each of the teeth via the first insulator and the second insulator and is electrically connected to the conductor pin, and a circuit board arranged in the axially other side of the stator core via the second insulator and including a through hole, the circuit board includes a notched portion in which the other side end of the conductor pin is inserted, the notched portion includes an opening radially connecting to the through hole, the notched portion includes a width in which at least a part of the conductor pin entwined with the wire is inserted, wherein the wire is entwined around a portion of the conductor pin that includes a solder material electrically connecting the wire and the conductor pin, the portion of the conductor pin includes a width that is smaller than a width of the notched portion, the second insulator includes a convex portion axially extending to the axially other side at a position radially inside of the conductor pin, the convex portion radially faces the conductor pin, the circuit board includes a recess which is defined by a portion of a radially inner surface of the circuit board that is indented radially outward, the recess includes a width in a circumferential direction greater than that of the opening of the notched portion, and the convex portion includes a width in the circumferential direction substantially the same as that of the recess and a thickness in the radial direction substantially the same as a depth in the radial direction of the recess, the convex portion is arranged in the recess.

8. The motor as set forth in claim 7, wherein the projection is arranged axially lower than an axially middle point of the stator core.

9. The motor as set forth in claim 7, wherein the first insulator and the second insulator are formed by resin-injection molding.

10. The motor as set forth in claim 7, wherein the stator core includes four teeth.

11. The motor as set forth in claim 10, wherein the motor includes at least two projections, each of the projections is arranged at a position between at least two of four spaces defined between neighboring teeth.

12. A fan comprising the motor as set forth in claim 7 wherein a plurality of blades are arranged on the rotor unit and arranged to generate an air flow upon a rotation of the motor.

13. A motor comprising:
a rotor unit rotatable about a center axis and including a rotor magnet;
a stator unit including:
    a stator core including a core back and a plurality of teeth radially outwardly extending from the core back, a radially outside surface of each of the teeth radially faces the rotor magnet,
    a first insulator arranged at an axially one side of the stator core,
    a second insulator arranged at an axially other side of the stator core, the second insulator includes a projection axially extending and arranged between circumferentially neighboring teeth and including a hole substantially axially extending therein from an axially other side end of the projection,
    a conductor pin inserted into the hole of the projection, an axially one side end of the conductive pin is arranged in the hole and an axially other side end of the conductor pin protrudes into the axially other side from the projection,
    a coil defined by winding a wire around each of the teeth via the first insulator and the second insulator and is electrically connected to the conductor pin,
    a notched portion in which the axially other side end of the conductor pin is inserted, and
    a circuit board arranged in the axially other side of the stator core via the second insulator, to which the other side end of the conductor pin is electrically connected, wherein the projection is arranged axially lower than an axially middle point of the stator core, the wire is entwined around a portion of the conductor pin that includes a solder material electrically connecting the wire and the conductor pin, the portion of the conductor pin includes a width that is smaller than a width of the notched portion, the second insulator includes a convex portion axially extending to the axially other side at radially inside of the conductor pin, the convex portion radially faces the conductor pin, the circuit board includes a recess which is defined by a portion of a radially inner surface of the circuit board that is indented radially outward, the recess includes a width in a circumferential direction greater than that of the opening of the notched portion, and the convex portion includes a width in the circumferential direction substantially the same as that of the recess and a thickness in the radial direction substantially the same as a depth in the radial direction of the recess, the convex portion is arranged in the recess.

14. The motor as set forth in claim 13, wherein the stator core includes four teeth.

15. The motor as set forth in claim 14, wherein the motor includes at least two projections, each of the projections are arranged at a position between at least two of four spaces defined between neighboring teeth.

16. The motor as set forth in claim 13, wherein
the core back includes a substantially annular shape with a center through hole,
the circuit board includes a through hole defined by a radially inner surface of the circuit board, and
the notched portion includes an opening radially connected to the through hole.

17. A fan comprising:
the motor as set forth in claim 13;
a plurality of blades arranged on the rotor unit and arranged to generate an air flow upon a rotation of the motor.

18. A motor comprising:
a rotor unit rotatable about a center axis and including a rotor magnet;
a stator unit including:
    a stator core including a core back in a substantially annular shape with a center through hole and a plurality of teeth radially outwardly extending from the core back, a radially outside surface of each of the teeth radially faces the rotor magnet,
    a first insulator attached to the stator core from an axially one side,
    a second insulator attached to the stator core from an axially other side, the second insulator includes a projection axially extending, arranged between circumferentially neighboring teeth and including a hole substantially axially extending therein from an axially other side end of the projection,
    a conductor pin inserted into the hole of the projection, an axially one side end thereof is arranged in the hole and an axially other side end of the conductor pin protrudes into the axially other side from the projection, a coil defined by winding a wire around each of the teeth via the first insulator and the second insulator and is electrically connected to the conductor pin, and a circuit board arranged in the axially other side of the stator core via the second insulator and including a through hole, the circuit board includes a notched portion in which the other side end of the conductor pin is inserted, the notched portion includes an opening radially connecting to the through hole, the notched portion includes a width in which at least a part of the conductor pin entwined with the wire is inserted, and a base arranged to support the stator unit thereon, wherein the wire is entwined around a portion of the conductor pin that includes a solder material electrically connecting the wire and the conductor pin, the portion of the conductor pin includes a width that is smaller than a width of the notched portion, the second insulator includes a convex portion axially extending to the axially other side at radially inside of the conductor pin, the convex portion radially faces the conductor pin, and the base includes a concave portion in which the convex portion of the second insular is fitted such that the stator unit is positioned on the base in a circumferential direction.

19. The motor as set forth in claim 18, wherein the projection is arranged axially lower than an axially middle point of the stator core.

20. The motor as set forth in claim 18, wherein the first insulator and the second insulator are made of a resin-injection molded material.

21. The motor as set for the in claim 18, wherein the stator core includes four teeth.

22. The motor as set forth in claim 21, wherein the motor includes at least two projections, each of the projections is arranged at a position between at least two of four spaces defined between neighboring teeth.

23. The motor as set forth in claim 18, wherein
the circuit board includes a recess which is defined by a portion of a radially inner surface of the circuit board that is indented radially outward,
the recess includes a width in a circumferential direction greater than that of the opening of the notched portion, and
the convex portion includes a width in the circumferential direction substantially the same as that of the recess and a thickness in the radial direction substantially the same as a depth in the radial direction of the recess, the convex portion is arranged in the recess.

24. A fan comprising the motor as set forth in claim 18, wherein a plurality of blades are arranged on the rotor unit and arranged to generate an air flow upon a rotation of the motor.

* * * * *